(12) United States Patent
Lee et al.

(10) Patent No.: US 12,522,147 B2
(45) Date of Patent: Jan. 13, 2026

(54) PET CARRIER SYSTEM FOR VEHICLE SEAT

(71) Applicant: GM GLOBAL TECHNOLOGY OPERATIONS LLC, Detroit, MI (US)

(72) Inventors: Minsu Lee, Gyeonggi-do (KR); Jongsuk An, Seo-gu (KR); Kwangseok Yu, Seoul (KR); Ilhan Kim, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 18/443,870

(22) Filed: Feb. 16, 2024

(65) Prior Publication Data

US 2025/0263018 A1    Aug. 21, 2025

(51) Int. Cl.
*B60R 7/04*      (2006.01)
*B60R 11/00*     (2006.01)
*B60R 22/10*     (2006.01)
*B60R 22/48*     (2006.01)

(52) U.S. Cl.
CPC ....... *B60R 7/043* (2013.01); *B60R 2011/0015* (2013.01); *B60R 22/10* (2013.01); *B60R 2022/485* (2013.01)

(58) Field of Classification Search
CPC ............. B60R 22/10; B60R 2011/0015; B60R 21/0153; B60R 21/01532; B60R 21/01534; B60R 21/01536; B60R 21/01538; B60R 2022/485
USPC ........................ 224/275; 297/188.04, 188.07
See application file for complete search history.

(56) References Cited

U.S. PATENT DOCUMENTS

| | | | | |
|---|---|---|---|---|
| 2,909,154 A | * | 10/1959 | Thomas | B60R 22/10 119/771 |
| 3,094,354 A | * | 6/1963 | Bernier | A47D 11/02 297/238 |
| 3,615,118 A | * | 10/1971 | Buxton | B64D 11/0638 297/163 |
| 4,512,286 A | * | 4/1985 | Rux | A01K 1/0272 119/771 |
| 4,597,359 A | * | 7/1986 | Moorman | A01K 27/002 119/28.5 |
| 4,690,455 A | * | 9/1987 | Bailey | B60N 2/3084 297/238 |
| 4,900,087 A | * | 2/1990 | Crisp | B60N 2/3084 297/238 |
| 5,005,526 A | * | 4/1991 | Parker | A01K 1/0272 119/751 |
| 5,133,294 A | * | 7/1992 | Reid | A01K 1/0272 119/771 |

(Continued)

FOREIGN PATENT DOCUMENTS

| | | | | |
|---|---|---|---|---|
| CN | 107031514 A | * | 8/2017 | ............ B60N 2/36 |
| CN | 108068705 B | * | 11/2022 | ............ B60N 2/90 |

(Continued)

*Primary Examiner* — Justin M Larson
(74) *Attorney, Agent, or Firm* — Ingrassia Fisher & Lorenz, LLP | IF&L

(57) ABSTRACT

A carrier system for carrying a pet in a vehicle includes a seat having a seat bottom and a seat back. A carrier is integrated into the seat back. The carrier has at least one panel movable between a stowed state in the seat back and a deployed state projecting from the seat back.

11 Claims, 4 Drawing Sheets

(56) References Cited

U.S. PATENT DOCUMENTS

| | | | | |
|---|---|---|---|---|
| 5,479,892 A * | 1/1996 | Edwards | ............... | B60R 21/02 |
| | | | | 297/250.1 |
| 6,026,646 A * | 2/2000 | Hansen | ............... | B60R 7/02 |
| | | | | 224/543 |
| 6,079,773 A * | 6/2000 | Hassan | ............... | B60R 7/043 |
| | | | | 297/188.13 |
| D461,966 S * | 8/2002 | Reece | ............... | D6/333 |
| 6,494,533 B1 * | 12/2002 | Bohler | ............... | B60N 3/004 |
| | | | | 297/188.05 |
| 7,002,457 B2 * | 2/2006 | Stevenson | ............... | B60R 22/48 |
| | | | | 280/801.1 |
| 7,300,105 B2 * | 11/2007 | Jasinski, II | ............... | B60N 3/004 |
| | | | | 297/125 |
| 7,383,789 B2 * | 6/2008 | Wilkes | ............... | A01K 1/0272 |
| | | | | 119/28.5 |
| 7,429,078 B1 * | 9/2008 | Tarlow | ............... | B60R 7/043 |
| | | | | 297/188.2 |
| 8,061,550 B2 * | 11/2011 | Browne | ............... | B60R 7/043 |
| | | | | 220/666 |
| 8,091,513 B1 * | 1/2012 | Garcia | ............... | A01K 1/0272 |
| | | | | 119/28.5 |
| 8,657,356 B2 * | 2/2014 | Pywell | ............... | B60N 2/36 |
| | | | | 224/275 |
| 8,973,985 B2 * | 3/2015 | Arakawa | ............... | B60N 2/64 |
| | | | | 297/112 |
| 9,609,845 B2 * | 4/2017 | Hartelius | ............... | B60R 22/10 |
| 9,781,900 B2 * | 10/2017 | Iinan | ............... | A01K 1/0035 |
| 10,131,282 B2 * | 11/2018 | Huebner | ............... | B60N 2/00 |
| 10,160,363 B2 * | 12/2018 | Aguilar Ruelas | ............... | B60N 2/26 |
| 10,214,132 B2 * | 2/2019 | Wang | ............... | A01K 1/0272 |
| 10,349,891 B2 * | 7/2019 | Johnson | ............... | A61B 5/1102 |
| 10,406,984 B2 * | 9/2019 | Hu | ............... | B60R 7/043 |
| 10,661,718 B2 * | 5/2020 | Hu | ............... | B60N 2/64 |
| 11,006,612 B2 * | 5/2021 | Ryan | ............... | B60N 3/001 |
| 11,498,518 B2 * | 11/2022 | Scheele | ............... | B60R 22/48 |
| 11,884,233 B1 * | 1/2024 | Furton | ............... | B60R 21/01512 |
| 11,904,794 B2 * | 2/2024 | Buttolo | ............... | A01K 27/004 |
| 11,981,279 B2 * | 5/2024 | Bond | ............... | B60R 21/01542 |
| 12,024,129 B1 * | 7/2024 | Hsu | ............... | B60R 7/043 |
| 12,054,172 B2 * | 8/2024 | Khamis | ............... | G06V 10/25 |
| 12,091,019 B2 * | 9/2024 | Ali | ............... | G01S 13/04 |
| 12,263,813 B1 * | 4/2025 | Hsu | ............... | B60R 7/043 |
| 2002/0140215 A1 * | 10/2002 | Breed | ............... | B60N 2/2863 |
| | | | | 280/735 |
| 2004/0119599 A1 * | 6/2004 | Stevenson | ............... | B60R 22/48 |
| | | | | 340/686.1 |
| 2015/0230424 A1 * | 8/2015 | Hartelius | ............... | B60R 22/10 |
| | | | | 248/505 |
| 2017/0106773 A1 * | 4/2017 | Aguilar Ruelas | ............... | B60R 22/34 |
| 2019/0184853 A1 * | 6/2019 | Thomas | ............... | A61B 5/117 |
| 2019/0380299 A1 * | 12/2019 | Shewfelt | ............... | B60R 22/10 |
| 2023/0341535 A1 * | 10/2023 | Zhang | ............... | G06V 40/165 |

FOREIGN PATENT DOCUMENTS

| | | | | |
|---|---|---|---|---|
| DE | 202004019523 U1 * | 3/2005 | ............... | B60N 2/60 |
| DE | 202015102526 U1 * | 6/2015 | ............... | B60R 7/043 |
| DE | 102017003646 B4 * | 5/2024 | ............... | A01K 1/0272 |
| EP | 957001 A1 * | 11/1999 | | |
| EP | 3187374 B1 * | 1/2019 | ............... | B60R 7/04 |
| FR | 2914602 A1 * | 10/2008 | ............... | B60R 22/10 |
| JP | H0681822 U * | 11/1994 | | |
| KR | 20090002652 U * | 3/2009 | ............... | B60R 7/08 |
| KR | 20210086890 A * | 7/2021 | ............... | B60R 7/043 |

* cited by examiner

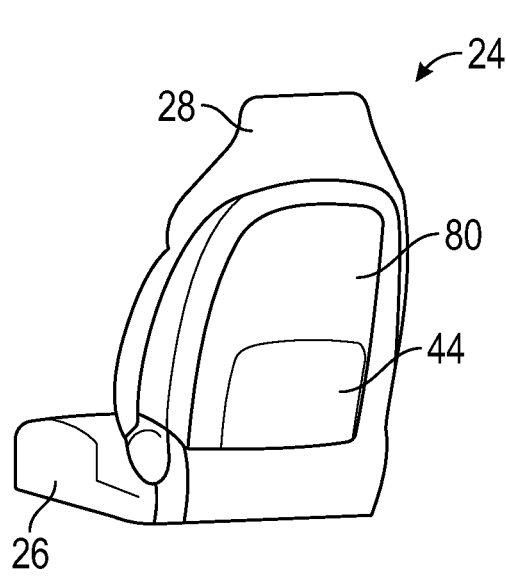
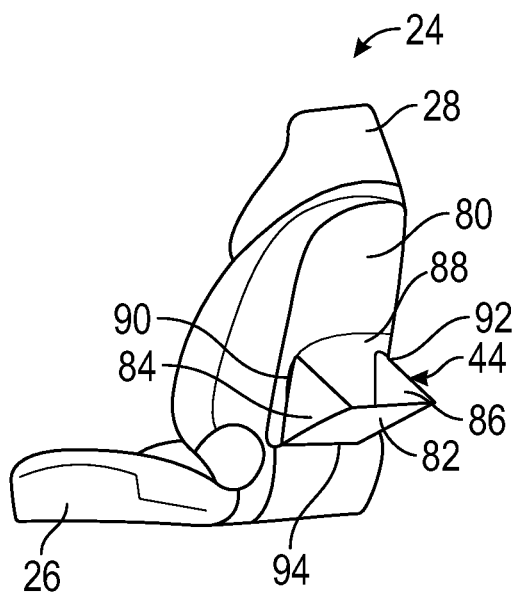
FIG. 2
FIG. 3
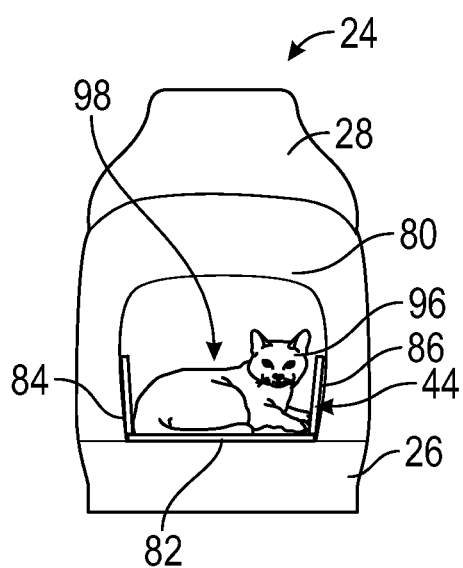
FIG. 4

PET CARRIER SYSTEM FOR VEHICLE SEAT

INTRODUCTION

The present disclosure generally relates to vehicle seats and more particularly relates to vehicle seats that accommodate carrying a pet.

Vehicle interiors include any of a number of seating arrangements for one or more passengers. A driver's seat is provided at the cockpit position and a front passenger seat is positioned alongside the driver's seat. One or more rows of rear seats may be provided vehicle the driver's seat and front passenger seat. The seats are designed for human passengers and generally have a seat bottom on which a passenger sits, and a seat back disposed at an obtuse angle relative to the seat bottom. The passenger generally rests against the seat back when seated on the seat bottom. Some seats may be foldable for stowage, such as to increase cargo carrying ability of the vehicle when the seat is not needed for passenger use.

Vehicle seats are designed for use by human passengers. The shapes and angles of the seat bottom and seat back are not necessarily the most accommodating for pet use. In addition, the seat area is open with no restrictions on a pet's movements. It would be advantageous to provide a vehicle seat having features designed for carrying a pet as a passenger in the vehicle. It would also be advantageous if such features require minimal space so as to not interfere with human passenger comfort or cargo loading when not in use.

Accordingly, it is desirable to provide vehicle seats with systems or features that various requirements of accommodating pets as passengers in a vehicle and require minimal space when not in use for use in various vehicle seat applications. Furthermore, other desirable features and characteristics of the present invention will become apparent from the subsequent detailed description and the appended claims, taken in conjunction with the accompanying drawings and the foregoing introduction.

SUMMARY

A carrier system for carrying a pet in a vehicle includes, in a number of embodiments, a seat having a seat bottom and a seat back. A carrier is integrated into the seat back. The carrier has at least one panel movable between a stowed state in the seat back and a deployed state projecting from the seat back.

In additional embodiments, a tether system is connected with the seat and has an end for coupling with a pet.

In additional embodiments, when the carrier is stowed in the seat back, the seat back includes a rear surface that is substantially continuous without projecting the carrier rearward from the rear surface.

In additional embodiments, a monitoring system operates to evaluate restraint and positioning of a pet.

In additional embodiments, a monitoring system operates to determine whether a pet is positioned in the carrier.

In additional embodiments, the carrier operates to unfold upward from the seat back, when the seat back is folded against the seat bottom.

In additional embodiments, the panel is a base panel of the carrier that, when the carrier is in the deployed state, is oriented substantially horizontal. The carrier includes at least two side panels projecting upward from the base panel when the carrier is in the deployed state.

In additional embodiments, the seat back serves as a forward side of the carrier, when the carrier is in the deployed state.

In additional embodiments, the carrier includes a forward side to limit movement of a pet in a forward direction.

In additional embodiments, the carrier is connected with a rear side of the seat back and projects from the seat back when the carrier is in the deployed state.

In a number of additional embodiments, a carrier system for a vehicle includes a seat having a seat bottom and a seat back. A carrier is integrated into the seat back. The carrier has a panel connected with the seat back that is movable between a stowed state in the seat back and a deployed state projecting from the seat back. The carrier, when in the deployed state, is constructed to carry a pet.

In additional embodiments, a tether system is connected with the seat and has an end for coupling with the pet. The tether system extends into the carrier.

In additional embodiments, when the carrier is in the stowed state, it is contained in the seat back. The seat back includes a rear surface that is substantially continuous, when the carrier is in the stowed state, without projecting the carrier rearward from the rear surface.

In additional embodiments, a monitoring system is operable to evaluate restraint and positioning of the pet, and to provide an alert based on the evaluation.

In additional embodiments, the monitoring system operates to determine whether the pet is positioned in the carrier and whether the tether is connected to the pet.

In additional embodiments, the seat back is foldable against the seat bottom so that the seat back is disposed in a substantially horizontal state. The carrier unfolds upward from the seat back, when the seat back is folded against the seat bottom.

In additional embodiments, the panel is a base panel of the carrier that, when the carrier is in the deployed state, is oriented substantially horizontal. The carrier includes two side panels projecting upward from the base panel when the carrier is in the deployed state. When the carrier is in the stowed state, the two side panels are contained in the seat back and concealed by the base panel.

In additional embodiments, the seat back acts as a forward side of the carrier to limit movement of the pet in a forward direction, when the carrier is in the deployed state.

In additional embodiments, the carrier includes a forward side to limit movement of a pet in a forward direction. The carrier includes an openable side configured to be open for the pet to enter the carrier.

In a number of other embodiments, a carrier system for a vehicle includes a seat that has a seat bottom and a seat back. A carrier is integrated into the seat back. The carrier has a panel connected with the seat back that is movable between a stowed state in the seat back and a deployed state projecting from the seat back. A monitoring system is operable to determine whether a pet is positioned in the carrier.

BRIEF DESCRIPTION OF THE DRAWINGS

The exemplary embodiments will hereinafter be described in conjunction with the following drawing figures, wherein like numerals denote like elements, and wherein:

FIG. 2 is a perspective illustration of a pet carrier system for the vehicle seat of FIG. 1 shown in an undeployed state, in accordance with various embodiments;

FIG. 3 is a perspective illustration of a pet carrier system for the vehicle seat of FIG. 1 shown in partially deployed state, in accordance with various embodiments;

FIG. 4 is a perspective illustration of a pet carrier system for the vehicle seat of FIG. 1 shown in a fully deployed state, in accordance with various embodiments;

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

Figure 1:
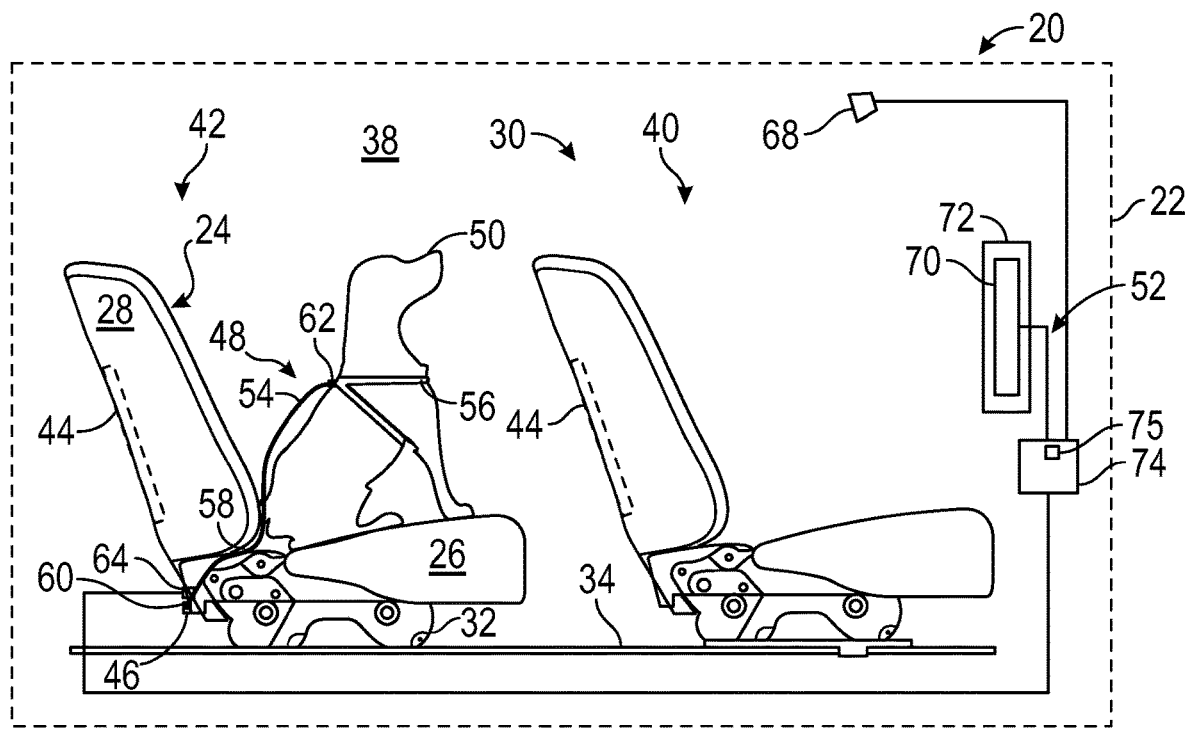
FIG. 1 is a schematic diagram of a part of a vehicle with a seat that has a pet carrier system, in accordance with various embodiments.

With reference to FIG. 1, illustrated is one example of a vehicle 20 having a body 22 on which a front seat row 40 and a rear seat row are mounted. In general, a representative seat 24 has a seat bottom 26, a seat back 28 and a pet carrier system 30. The pet carrier system 30 may be at least partly integrated into the seat 24 (and/or any other seat of the vehicle 20) and may be provided as original equipment in the vehicle 20. For example, the seat 24 may have components of the pet carrier system in or on the seat back 28, the seat bottom 26 and/or a frame 32 that supports the seat 24 and may connect it with a floor 34 of the vehicle 20. It will be appreciated that the vehicle 20 may have a plural number of seats arranged in multiple rows.

As depicted in FIG. 1, the body 22 of the vehicle 20 may be supported on wheel assemblies (not shown), such as by a suspension assembly (not shown). The body 22 may be of various types that define a physical shape for desired purposes. The body 22 substantially encloses components of the vehicle 20, defines exterior surfaces, and defines an interior 38. The wheel assemblies may each be rotationally coupled near a respective corner of the body 22. In various embodiments, the vehicle 20 may be a front wheel drive vehicle, a rear wheel drive vehicle, or an all-wheel drive vehicle with any number of wheels, however other drive arrangements are contemplated.

Propulsion of the vehicle 20, such as on a roadway, is provided by a propulsion system (not shown). The propulsion system may be any of various types such as electric, internal combustion, hybrid, or others. Torque generated by the propulsion system is transferred to the wheel assemblies to propel the vehicle 20, which may be done under manual and/or autonomous control.

In the embodiment illustrated in FIG. 1, the interior 38 of the vehicle 20 includes the front seat row 40 and the rear seat row 42. In other embodiments, additional or fewer seat rows may be included. The front seat row 40 includes a seat back 28 that is generally intended to remain upright as shown. The rear seat row 42 includes the seat 24, which may be operable to fold, such as in a fold flat or other configuration. The pet carrier system 30 may be used in any seat row such as the front set row 40 and/or the rear seat row 42.

The pet carrier system 30 may include various aspects such as a carrier 44 that is stowable in the seat back 28, an anchor 46 connected with the seat frame 32, a restraint system 48 connectable with the anchor 46 and a pet 50 and a monitoring system 52. For example, the carrier 44 may fold into the seat 24 and may unfold out of the seat 24. Including the carrier 44 provides the options of carrying the pet 50, or plural pets 50, in the carrier(s) 44 (when deployed) and/or on the seat bottom 26, while benefitting from the restraint system 48 and the monitoring system 52 in either or both options.

As illustrated in FIG. 1, the pet 50 is carried on the seat bottom 26. The restraint system 48 includes a tether 54 connected with the anchor 46 and a harness 56 on the pet 50. When used for this option, the tether 54 passes through a gap 58 between the seat bottom 26 and the seat back 28. In other embodiments, the anchor 46 may be located, or may include an extension (not shown) that is located at the forward side of the gap 58. A connector 60 may be included to releasably connect the tether 54 with the anchor 46 and another connector 62 may be included for releasably connecting the tether 54 with the harness 56. The connectors 60, 62 may be snap clips or another type of connector to provide a secure, quick and easy releasable connection. The length of the tether 54 may be adjustable to accommodate different sizes of the pet 50. In the current embodiment, the pet 50 may be carried on the seat bottom 26 with benefit of the monitoring system 52.

The monitoring system 52 includes various aspects for evaluating the state of the restraint system 48 and of the pet 50 and reporting the results of those evaluations to a driver and/or other occupant of the vehicle 20. As illustrated in FIG. 1, the monitoring system is shown in an option use configuration and is also intended for use with the pet 50 in the carrier 44. In either case, the monitoring system includes a tether sensor 64 for monitoring whether the tether 54 is connected with the anchor 46. The tether sensor 64 may be any type of sensor that is capable of providing an output signal indicative of whether the connector 60 is coupled with the anchor 46 and/or with the pet 50. For example, the tether sensor 64 may be a proximity or position sensor or may be a type of switch that provides an open or closed indication corresponding to a connected or disconnected state, respectively of the connector 60 and anchor 46 connection.

The monitoring system 52 includes a pet sensor 68. The pet sensor 68 may be located at, in or on the seat 24 or remote as shown in FIG. 1. The pet sensor 68 may be a pressure sensor, a proximity sensor, a vison system, an infrared sensor, an ultrasonic sensor a radar system, or any type of sensor that provides a signal indicative of whether the pet 50 is properly positioned.

The monitoring system 52 includes an interface 70 for communicating information to and/or from the driver and/or other occupant of the vehicle 20. The interface 70 may include an indicator light or symbol that provides information about the state of the connection between the connector 60 and the anchor 46 as provided by the tether sensor 64. The interface 70 may provide audio outputs. The interface 70 may include an indicator light or symbol that provides information about the state of the positioning of the pet 50 as provided by the pet sensor 68. The interface 70 may be in the driver information center 72 of the vehicle 20.

The monitoring system 52 includes a controller 74. In other embodiments, any number of controllers may be used in place of the controller 74. For purposes of the current embodiment, the controller 74 controls operation of the monitoring system 52 and may provide other functions. The controller 74 may comprise any number of electronic control modules and may receive various inputs including from the tether sensor 64 and the pet sensor 68. The inputs are analyzed, and results are computed from the data and applied to the interface 70 and may be applied to other responsive devices as appropriate. The controller 74 may receive various signals, including from tether sensor 64 and the pet sensor 68, conduct analyses, and send control signals to various destinations, including to the interface 70. The controller 74 may include a processor 75, a memory device (not shown), and may include or be coupled with coupled with a storage device (not shown). The processor may generate control signals for the monitoring system 52 based on the logic, calculations, methods, and/or algorithms. For example, the monitoring system 52 may provide an indication that the tether 54 is connected to the anchor 46 and/or that the pet 50 is in a proper position. The monitoring system 52 may provide alerts, such as that the tether 54 is disconnected and/or that the pet 50 is outside a defined position.

Referring to FIG. 2, the seat 24 is shown in isolation. The carrier 44 is shown in a stowed state in the seat back 28. In the stowed state, the carrier 44 is closed and may be contained within the seat back 28 so that the surface 80 is substantially continuous without projecting rearward from the surface 80. The carrier 44 may be maintained in the stowed/closed state by a latch or catch (not shown). The carrier 44 is shown in a partially deployed state in FIG. 3. The carrier 44 includes a base panel 82 and two side panels 84 and 86. The side panels 84 and 86 are connected with the base panel 82 to create a four sided structure with the surface 80. The seat back 28 includes a recess 88 into which the base panel 82 fits and two slots 90 and 92 that receive the side panels 84 and 86, respectively. The carrier 44 is connected with the seat back by a hinge 94 that connects with the base panel 82. When in the stowed state of FIG. 2, the base panel 82 conceals the side panels 84 and 86 in the seat back 28. FIG. 4 shows the carrier 44 in a fully deployed state ready for use by a pet 96. The base panel 82 is disposed in a horizontal or substantially horizontal state for supporting the pet 96. The side panels 84 and 86 are substantially vertical and extend upward from opposite ends of the base panel 82. As a result, a dedicated space 98 is provided for the pet 96. In the case of a rapid deceleration of the vehicle 20, the pet 96 is maintained in the space 98 and is limited in moving forward by the seat back 28. A tether, screen cover or other device may be used to prevent the pet 96 from exiting the space 98, if desired.

Figures 5, 6:
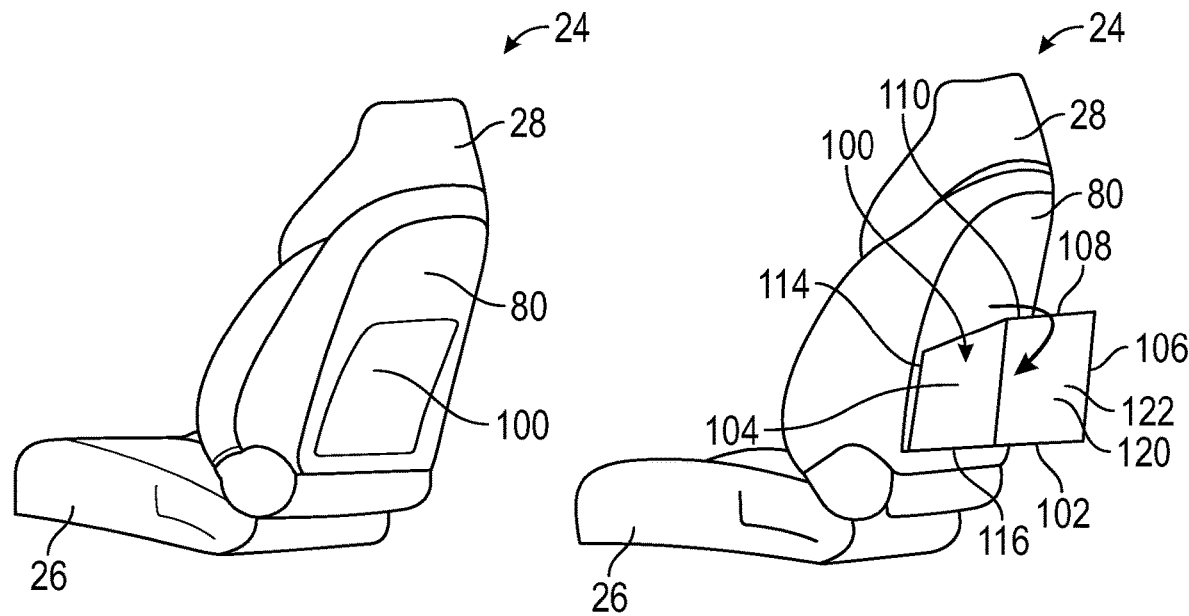
FIG. 5 is a perspective illustration of a pet carrier system for the vehicle seat of FIG. 1 shown in an undeployed state, in accordance with various embodiments.
FIG. 6 is a perspective illustration of a pet carrier system for the vehicle seat of FIG. 1 shown in a deployed state, in accordance with various embodiments.

Referring to FIGS. 5 and 6, a carrier 100 is contained in the seat back 28 of the seat 24 and illustrated in a stowed state in FIG. 5. In the stowed state, the carrier 100 is closed and may be contained within the seat back 28 so that the surface 80 is substantially continuous without projecting rearward from the surface 80. The carrier 100 is shown in a deployed state in FIG. 6. The carrier 100 includes a base panel 102, two side panels 104 and 106, and a top panel 108. The side panels 104 and 106 are connected with the base panel 102 and with the top panel 108 to create a five sided structure, including with the surface 80. The seat back 28 includes a recess 110 into which the carrier 100 fits.

The top panel 108 is connected with the seat back 28 by a hinge 114 and the base panel 102 is connected with the seat back by a hinge 116. FIG. 6 shows the carrier 100 in a fully deployed state ready for use by a pet. The base panel 102 is disposed in a horizontal or substantially horizontal state for supporting the pet. The side panels 104 and 106 are substantially vertical and extend upward from opposite ends of the base panel 102 to opposite ends of the top panel 108. The base panel 102 and the top panel 108 may be rigid. The side panels 104 and 106 may be made of a flexible or pliable material so that when the carrier 100 is closed, they are sandwiched between the top panel 108 and the base panel 102. As the base panel 102 is opened by rotating on the hinge 116. The side panels 104 and 106 may be pulled along and may unfold and may pull the top panel 108. In other embodiments, the side panels 104 and 106 may also be hinged to the seat back by hinges (not shown), that are vertically disposed. When the base panel 102 is opened, the side panels 104 and 106 may be rotated into the positions shown in FIG. 6. As a result, a dedicated space 120 is provided for a pet. It will be appreciated that articles other than a pet may be carried in the carrier 100. In the case of a rapid deceleration of the vehicle 20, the pet is maintained in the space 120 and is limited in moving forward by the seat back 28. A tether, screen, cover or other device may be used to prevent the pet from exiting the space 120, through the open rear facing side 122, if desired.

Figure 7:
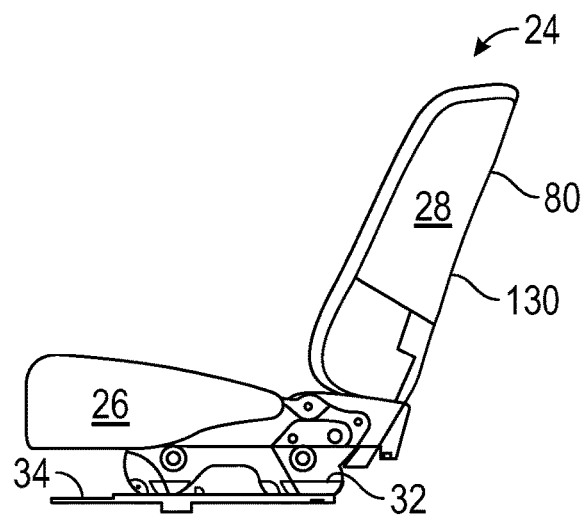
FIG. 7 is a side illustration of a pet carrier system for the vehicle seat of FIG. 1 shown in an undeployed state, in accordance with various embodiments.
Figure 8:
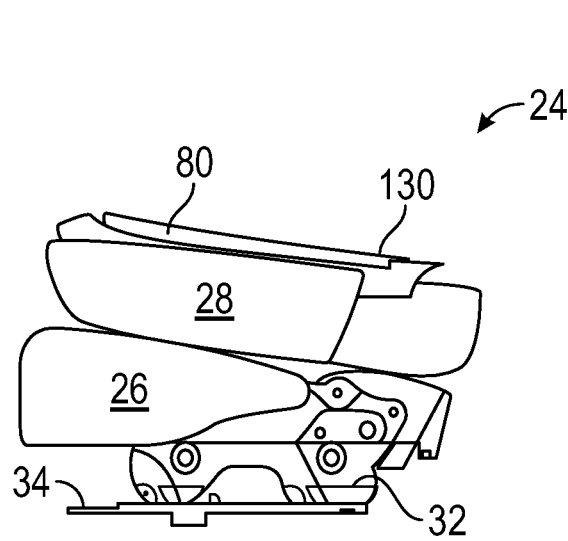
FIG. 8 is a perspective illustration of a pet carrier system for the vehicle seat of FIG. 1 shown in a partially deployed state, in accordance with various embodiments.

Referring to FIG. 7, the seat 24 is shown in a folding form connected with the floor 34 of the vehicle 20 by the frame 32. A carrier 130 is shown in a stowed state in the seat back 28. In the stowed state, the carrier 130 is closed and may be contained within the seat back 28 so that the surface 80 is substantially continuous without projecting the carrier 130 rearward from the surface 80. The carrier 130 may be maintained in the stowed/closed state by a latch or catch (not shown). In FIG. 8, the seat 24 is shown in a folded state with the seat back 28 rotated forward to a position flat against the seat 24. While the seat 24 remains above the floor 34 in this illustration, in other embodiments, the seat 24 may fold into or through the floor 34. With the seat 24 folded, the carrier 130 remains stowed in the seat back 28.

Figure 9:
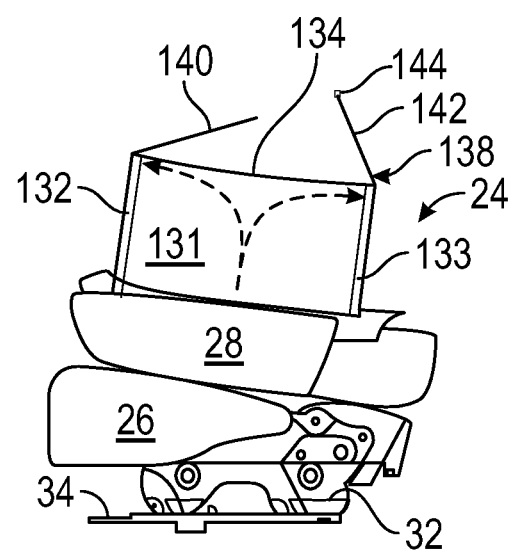
FIG. 9 is a perspective illustration of a pet carrier system for the vehicle seat of FIG. 1 shown in a fully deployed state, in accordance with various embodiments.

The carrier 130 is shown in a deployed state in FIG. 9. The carrier 130 includes four side panels 131-134 (with side panel 134 in the background behind side panel 131). The side panes 131-134 are rotated to open positions so as to be vertically, or substantially vertically oriented. The seat back 28 serves as the base panel or bottom of the carrier 130. The side panels 132 and 133 may be hinged to the seat back 28 and may open in opposite directions to become front and rear sides of the carrier 130. The side panels 131 and 134 may be hinged to the seat back 28 or may be a pliable/flexible material connected with the seat back 28 and the side panels 132 and 133 and serve as lateral sides of the carrier 130. With four sides and a bottom, only the top of the carrier remains open. In some embodiments, a lid 138 may be provided for the carrier with a lid panel 140 hinged to the side panel 132 and another lid panel 142 hinged to the side panel 133. A latch 144 may be provided to hold the lid 138 closed. In other embodiments, a tether, a screen cover or other device may be used to prevent the pet from exiting the carrier 130, if desired.

Figure 10:
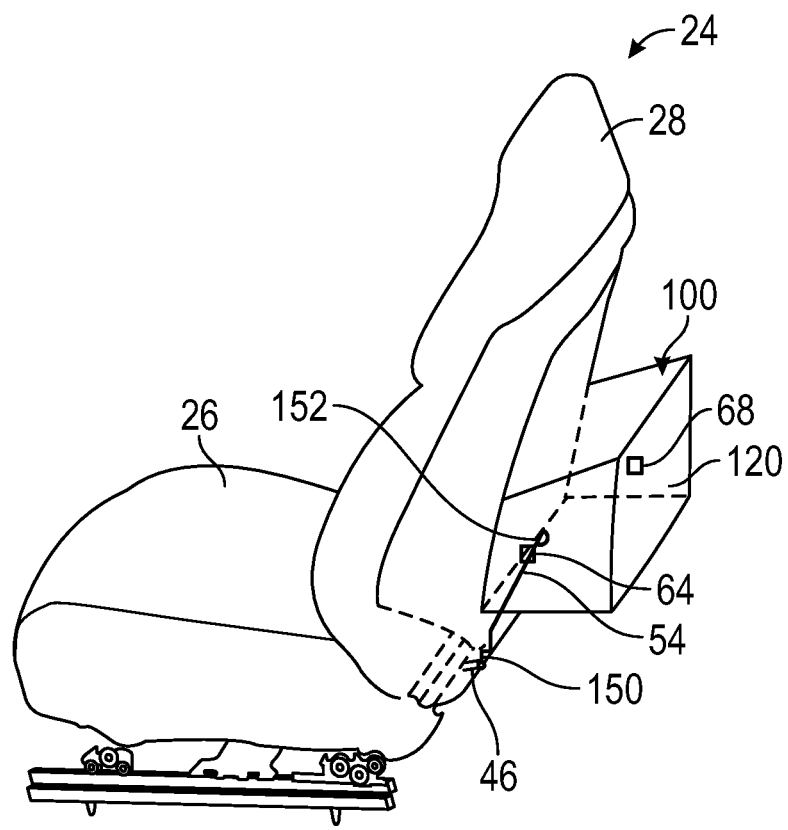
FIG. 10 is a schematic illustration of the pet carrier system of FIG. 1 illustrating an alternative use, in accordance with various embodiments.

Referring to FIG. 10, use of the monitoring system 52 with the carrier 100 of FIG. 6 is shown. The tether 54 includes an end 150 connected with the anchor 46 and an end 152 that is disposed within the space 120 of the carrier 100 for connection with the pet such as through the harness 56. The tether sensor 64 may be disposed at either or both ends 150/152 of the tether 54. The pet sensor 68 may be disposed in or on the carrier 100 to sense the positioning of the pet. The monitoring system 52 may provide an indication to the driver that the pet is present and properly positioned. The monitoring system 52 may provide alerts if the pet becomes improperly positioned or the tether 54 becomes disconnected. The monitoring system 52 may provide an alert if the pet is present and the driver exits the vehicle 20, such as through the interface 70, or the horn or alarm system of the vehicle 20.

Accordingly, an integrated pet carrier system is provided for a vehicle seat that provides the benefit of providing the option of placing the pet in a contained space or on the seat. The carrier is foldable into a vehicle seat and deployable from the seat for use when desired. When stowed, the carrier does not require any vehicle space other than within the seat. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A pet carrier system for a vehicle comprising:
a seat having a seat bottom and a seat back, wherein the seat bottom includes a seating surface, and wherein the seat back has a front side and a rear side, with the front side facing toward the seat bottom and the rear side facing away from the seat bottom;
a carrier integrated into the seat back on the rear side, the carrier having a base panel movable between a stowed state in the seat back and a deployed state projecting away from the seat bottom and out from the rear side of the seat back, and disposed substantially horizontal, wherein the carrier defines a dedicated space for the pet and the base panel is configured to support the pet, wherein forward movement of the pet is limited by the seat back, wherein the seat back includes a recess into which the base panel fits when in the stowed state, and wherein the carrier, when in the deployed state, is configured to carry the pet in a space defined by the carrier and the recess;
and a monitoring system configured to evaluate restraint and positioning of the pet, wherein the monitoring system includes: an anchor connected to the seat; a tether configured to connect with the anchor and with the pet; a first tether sensor disposed at a first end of the tether and configured to detect whether the tether is connected with the anchor; and a second tether sensor disposed at a second end of the tether and configured to detect whether the tether is connected with the pet.

2. The carrier system of claim 1, wherein when the carrier is stowed in the seat back, the seat back includes a rear surface that is substantially continuous without projecting the carrier rearward from the rear surface.

3. The carrier system of claim 1, wherein the carrier is configured to unfold upward from the seat back, when the seat back is folded against the seat bottom.

4. The carrier system of claim 1, wherein, in the deployed state:
the carrier includes a top panel disposed above and spaced part from the base panel; and
the carrier includes two side panels projecting upward from the base panel to the top panel,
wherein the two side panels are substantially vertically disposed,
wherein the base panel and the top panel are rigid,
wherein the two side panels are flexible,
wherein the base panel, the top panel, the two side panels and the seat back define the dedicated space for the pet on the rear side of the seat back.

5. The carrier system of claim 1, wherein the seat is configured to carry a passenger on the seat bottom, when the carrier is in the deployed state and contains the pet.

6. The carrier system of claim 1, wherein when the carrier is in the stowed state it is contained in the seat back and an external surface of the seat back is partially defined by the carrier and is substantially continuous and consistent in appearance with other areas of the seat back and without the carrier projecting rearward from the surface.

7. A pet carrier system for a vehicle comprising:
a seat having a seat bottom and a seat back, wherein the seat bottom includes a seating surface, and wherein the seat back has a front side and a rear side, with the front side facing toward the seat bottom and the rear side facing away from the seat bottom;
a carrier integrated into the seat back on the rear side, the carrier having a base panel movable between a stowed state in the seat back and a deployed state projecting away from the seat bottom and out from the rear side of the seat back, and disposed substantially horizontal, wherein the carrier defines a dedicated space for the pet and the base panel is configured to support the pet, and wherein forward movement of the pet is limited by the seat back;
and a monitoring system configured to evaluate restraint and positioning of the pet, wherein the monitoring system includes: an anchor connected to the seat; a tether configured to connect with the anchor and with the pet; a first tether sensor disposed at a first end of the tether and configured to detect whether the tether is connected with the anchor; and a second tether sensor disposed at a second end of the tether and configured to detect whether the tether is connected with the pet.

8. The carrier system of claim 7, wherein the carrier, when in the stowed state, is contained in the seat back, the seat back includes a rear surface that is substantially continuous, when the carrier is in the stowed state, without projecting the carrier rearward from the rear surface.

9. The carrier system of claim 7, wherein the seat back is foldable against the seat bottom so that the seat back is disposed in a substantially horizontal state, wherein the carrier is configured to unfold upward from the seat back, when the seat back is folded against the seat bottom.

10. The carrier system of claim 7, wherein, in the deployed state:
the carrier includes a top panel disposed above and spaced part from the base panel; and
the carrier includes two side panels projecting upward from the base panel to the top panel,
wherein the two side panels are substantially vertically disposed,
wherein the base panel and the top panel are rigid,
wherein the two side panels are flexible, wherein the base panel, the top panel, the two side panels and the seat back define the dedicated space for the pet on the rear side of the seat back.

11. The carrier system of claim 7, wherein the seat is configured to carry a passenger on the seat bottom, when the carrier is in the deployed state and contains the pet.

* * * * *